Figure 1:
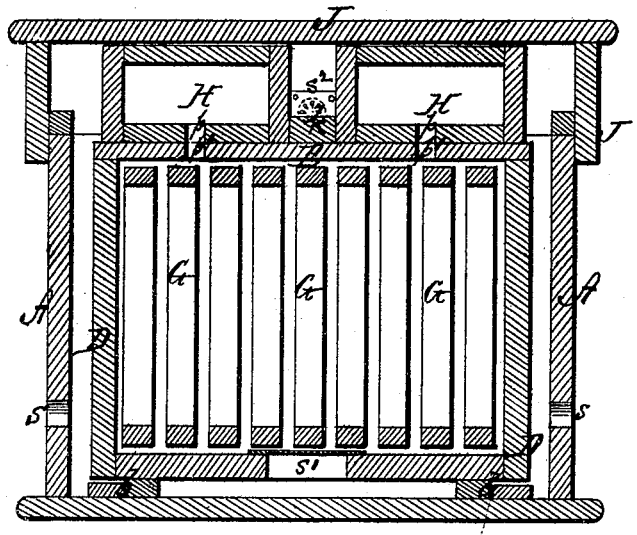
Figure 2:
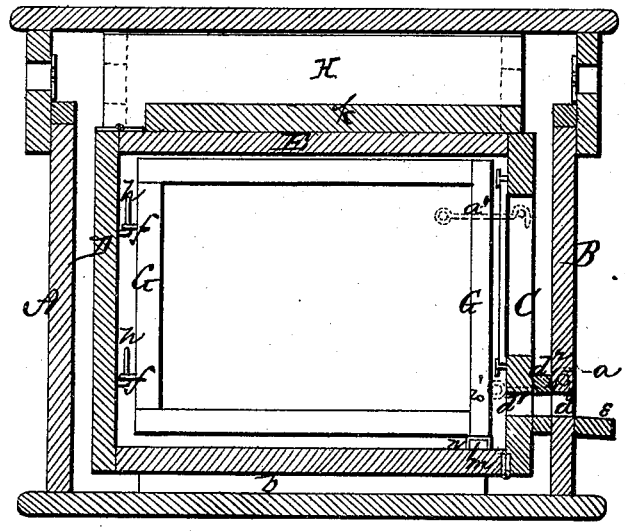

A. J. STERNBERG.
Bee-Hives.

No. 142,748. Patented September 9, 1873.

Witnesses
John A. Ellis
Edward O. Ellis

Inventor
Adam J. Sternberg
By
T. H. Alexander & Co.
Atty's

UNITED STATES PATENT OFFICE.

ADAM J. STERNBERG, OF BUTLER, INDIANA.

IMPROVEMENT IN BEE-HIVES.

Specification forming part of Letters Patent No. 142,748, dated September 9, 1873; application filed June 11, 1873.

*To all whom it may concern:*

Be it known that I, ADAM J. STERNBERG, of Butler, in the county of DeKalb and State of Indiana, have invented certain new and useful Improvements in Bee-Hives; and I do hereby declare that the following is a full, clear, and exact description thereof, reference being had to the accompanying drawings and to the letters of reference marked thereon which form a part of this specification.

The nature of my invention consists in the construction and arrangement of a bee-hive, as will be hereinafter more fully set forth.

In order to enable others skilled in the art to which my invention appertains to make and use the same, I will now proceed to describe its construction and operation, referring to the annexed drawing, in which both figures represent vertical sections of my bee-hive.

A represents a box of any suitable dimensions, forming the outer hive, and the front B of which is made loose, and held in position by hooks $a$ $a$, or other suitable means. On the bottom of the box A are cleats $b$ $b$, upon which is placed an interior box or hive, D, forming an air-chamber all around said interior hive between it and the exterior hive A. The front C, as well as the two sides of the interior hive D, are hinged at their lower edges, and held in place by hooks $a'$ $a'$, or other suitable means. In the front B of the exterior hive A is the bee-entrance $d$, with alighting-board $e$ on the outside. A corresponding entrance, $d^1$, is made in the front C of the interior hive D; and the two entrances $d$ $d^1$ are connected by a square tube or passage, $d^2$, so that the bees cannot pass into the air-chamber between the two hives. The top E of the interior hive D is hinged to the back; and, when closed, rests upon the comb-frames G G. These frames may be of any suitable construction, and hung upon hooks $h$ $h$ to the back of the interior hive D by eye-screws $f$ $f$, or their equivalents, inserted in the frames. The front or loose ends of the frames are supported upon a cleat, $m$, which is completely enveloped by tin, $n$, or other suitable sheet metal; and these ends of the frames are held a suitable distance apart by pins $i$ $i$, as shown. On the upper side of the top E is a cleat, $k$, forming a division between the two honey-boxes H H, which are placed on said top. In the bottom of said honey-boxes are openings $p$, with corresponding openings $p'$ in the top E, to form passages for the bees from the brood-chamber D to the honey-boxes and return. The entire hive, thus constructed, is covered by a cap, J, having interior cleats to rest upon the top edges of the exterior hive A. Ventilation is had by means of ventilators $s$ $s$ in the sides of the exterior hive A, $s^1$ in the bottom and sides of the interior hive D, and $s^2$ in the sides of the cap J.

Having thus fully described my invention, what I claim as new, and desire to secure by Letters Patent, is—

1. The interior hive D, with hinged, front, sides and top, in combination with the comb-frames G G within said hive, and the exterior hive A surrounding the hive D, with an air-chamber between the two hives, substantially as set forth.

2. The within-described bee-hive, consisting of the exterior hive A, with loose front B, interior hive D with hinged front, sides, and top, comb-frames G G hung as described, honey-boxes H H, and cap J, all substantially as herein set forth.

In testimony that I claim the foregoing as my own I affix my signature in presence of two witnesses.

ADAM J. STERNBERG.

Witnesses:
S. W. OTIS,
J. D. PRICE.